US008670782B2

(12) United States Patent
Hampapur et al.

(10) Patent No.: US 8,670,782 B2
(45) Date of Patent: Mar. 11, 2014

(54) SYSTEMS AND METHODS FOR ANALYZING SPATIOTEMPORALLY AMBIGUOUS EVENTS

(75) Inventors: Arun Hampapur, Norwalk, CT (US); Bert Huang, New York, NY (US); Lexing Xie, Canberra (AU); Yada Zhu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/158,348

(22) Filed: Jun. 10, 2011

(65) Prior Publication Data

US 2012/0315920 A1    Dec. 13, 2012

(51) Int. Cl.
*H04W 24/00*    (2009.01)
*G06K 9/00*    (2006.01)
*G01R 31/28*    (2006.01)

(52) U.S. Cl.
USPC ........... 455/456.1; 348/152; 382/100; 714/25

(58) Field of Classification Search
USPC ........ 370/401, 395.1; 375/240.12; 455/456.1, 455/466.12
See application file for complete search history.

(56) References Cited

U.S. PATENT DOCUMENTS

| 7,096,121 | B2 | 8/2006 | Intriligator | |
|---|---|---|---|---|
| 7,346,597 | B2 | 3/2008 | Dumas | |
| 7,620,108 | B2 | 11/2009 | Miao | |
| 2003/0018928 | A1* | 1/2003 | James et al. | 714/25 |
| 2007/0291117 | A1* | 12/2007 | Velipasalar et al. | 348/152 |
| 2008/0130951 | A1 | 6/2008 | Wren et al. | |
| 2008/0285651 | A1 | 11/2008 | Au | |
| 2008/0310506 | A1 | 12/2008 | Xu | |
| 2009/0002492 | A1 | 1/2009 | Velipasalar | |
| 2009/0060266 | A1* | 3/2009 | Sornborger et al. | 382/100 |
| 2010/0098289 | A1* | 4/2010 | Tognoli et al. | 382/100 |
| 2010/0104203 | A1 | 4/2010 | Garakani | |

OTHER PUBLICATIONS

Rees, et al. "The spatial-temporal ambiguity in auroral modeling". Journal of Geophysical Research, vol. 85, No. A3, pp. 1235-1245, 1980.
U.Y. Nahm, "Mining Soft-Matching Association Rules". Proceedings of the CIKM-2002, pp. 681-683, Nov. 2002.
I.J. Myung, "Tutorial on Maximum Likelihood Estimation". Journal of Mathematical Psychology, vol. 47, pp. 90-100, Academic Press, 2003.
J. Cheng, "An Algorithm for Bayesian Belief Network Construction from Data". In Proceedings of AI & Statistics 1997, 1997.

(Continued)

*Primary Examiner* — Jinsong Hu
*Assistant Examiner* — William Nealon
(74) *Attorney, Agent, or Firm* — Anne V. Dougherty; Otterstedt, Ellenbogen & Kammer, LLP (57) ABSTRACT

Principles of the invention provide techniques for analyzing spatiotemporally ambiguous events. In one aspect, an exemplary method includes the steps of storing event data representative of an event, the event data comprising spatiotemporally ambiguous measurements; storing side information, the side information comprising at least one of spatial data and temporal data related to the event in space-time: associating the event data with the side information by soft association to form association data; applying one or more estimation techniques to the association data to form estimation data; and determining at least one of a rate, a factor, a likelihood, a value, a time, a location, and a cause for the event by applying one or more characterization techniques to the estimation data.

14 Claims, 3 Drawing Sheets

(56) References Cited

OTHER PUBLICATIONS

R.L. Prentice et al., "The Analysis of Failure Times in the Presence of Competing Risks" Biometrics, vol. 34, No. 4, pp. 541-554, International Biometric Society, Dec. 1978.

A. Gichangi et al., "The Analysis of Competing Risks Data: A Guided Tour". University of Southern Denmark, Odense, Denmark, 2005.

P-N Tan et al., "Introduction to Data Mining". Pearson Addison Wesley, 2006. (Ch 6).

R.O. Duda, Pattern Classification 2nd Edition, John Wiley and Sons, 2004. (Section 2.2, 2.9-2.11, 3.2-3.5, and 3.10).

Anonymous, published by Wikipedia, "Spatial analysis" pp. 1-11, downloaded from http://en.wikipedia.org/wiki/Spatial_analysis on Jun. 6, 2011.

Anonymous, published by Lindsay-Sherwin Partnership, Oxford, UK, "Improving Processes & Services" pp. 1-2, downloaded from http://www.lindsay-sherwin.co.uk/improvement_guide/html_tools/cause_and_effect_analysis.htm on Jun. 6, 2011.

Anonymous, published by HCI Services, Sydney, Australia, "Cause & Effect Diagram" pp. 1-5, downloaded from http://www.hci.com.au/hcisite3/toolkit/causeand.htm on Jun. 6, 2011.

Anonymous, published by National Institute of Standards and Technology, Washington, DC, Engineering Statistics Handbook, Section 8.4.1.2, "Maximum likelihood estimation" pp. 1-3 downloaded from http://www.itl.nist.gov/div898/handbook/apr/section4/apr412.htm on Jun. 6, 2011.

\* cited by examiner

SYSTEMS AND METHODS FOR ANALYZING SPATIOTEMPORALLY AMBIGUOUS EVENTS

FIELD OF THE INVENTION

The present invention relates to the electrical, electronics and computer arts, and, more particularly, to systems and methods for analyzing spatiotemporally ambiguous events and the like.

BACKGROUND OF THE INVENTION

A spatiotemporally ambiguous event (SAE) is characterized by data that suffers from significant location and/or time measurement inaccuracies. For example, location data collected by devices such as cell phones may be spatiotemporally ambiguous because many cell phones only associate a given location with a street address rather than providing more precise geo-location information. One conventional analysis technique for dealing with such spatiotemporally ambiguous data is to simply make the scale of the modeling coarse enough to allow the ambiguity to become negligible.

SUMMARY OF THE INVENTION

Principles of the invention provide techniques for analyzing SAEs. In one aspect, an exemplary method includes the steps of storing event data representative of an event, the event data comprising spatiotemporally ambiguous measurements; storing side information, the side information comprising at least one of spatial data and temporal data related to the event in space-time; associating the event data with the side information by soft association to form association data; applying one or more estimation techniques to the association data to form estimation data; and determining at least one of a rate, a factor, a likelihood, a value, a time, a location, and a cause for the event by applying one or more characterization techniques to the estimation data.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein. Techniques of the present invention can provide substantial beneficial technical effects. For example, one or more embodiments may provide one or more of the following advantages:

More precise location and time estimates;
More precise estimates of the effects of environmental factors on such things as maintenance and public health; and
More precise forecasts of future instances of such things as maintenance issues and public health issues.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
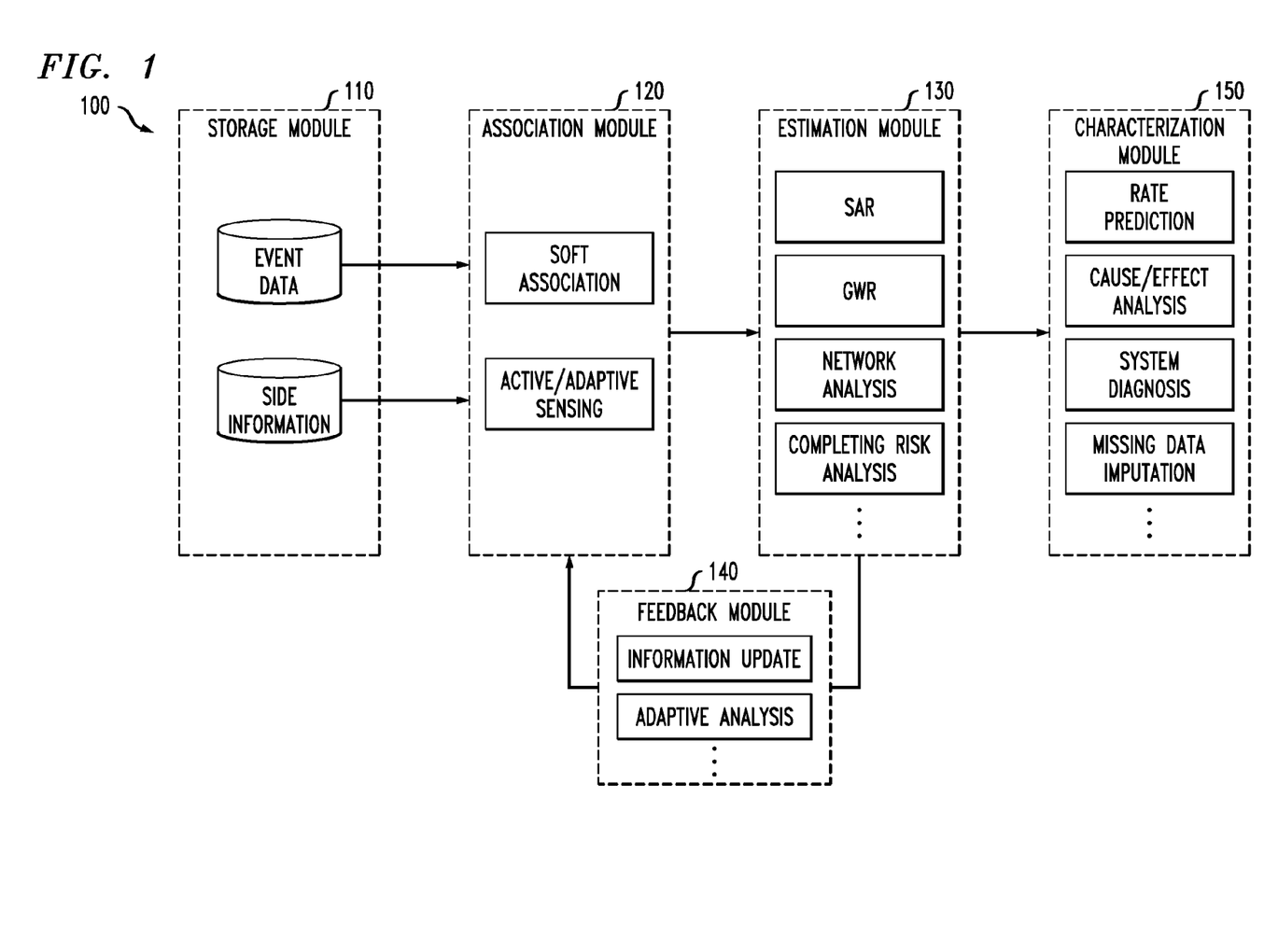
FIG. 1 shows a block diagram of a system in accordance with an illustrative embodiment of the invention.

FIG. 1 shows a system 100 in accordance with an illustrative embodiment of the invention for analyzing SAEs. For ease of understanding, the system 100 may be divided into several modules: a storage module 110, an association module 120, an estimation module 130, a feedback module 140, and a characterization module 150. As will be detailed below, the system 100 may be implemented by hardware modules, software modules stored in a computer readable storage medium (or multiple such media) and implemented on a hardware processor, or by a combination thereof. In any case, each module 110, 120, 130, 140, 150 serves one or more functions in analyzing an SAE.

Figure 2:
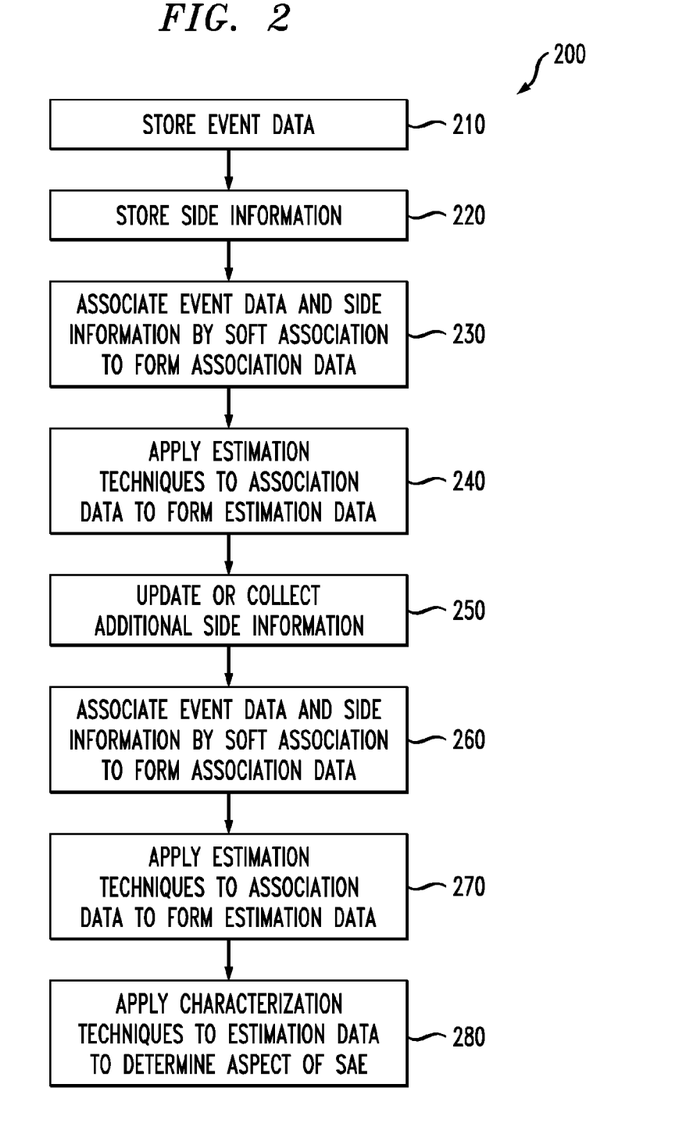
FIG. 2 shows an illustrative method for utilizing the FIG. 1 system to analyze an SAE.

FIG. 2 shows a flow diagram for a method 200 of utilizing the system 100 to analyze a particular SAE. In step 210, the storage module 110 stores event data related to the SAE in a memory (e.g., a random access memory, a read only memory, a fixed memory device such as a hard drive, a removable memory device such as a diskette, or a flash memory). For purposes of this disclosure, the term "event data" shall encompass data comprising spatiotemporally ambiguous measurements, namely, measurements that have an associated geo-location and/or time that may not be perfectly accurate. In step 220, the storage module 110 also stores side information associated with the SAE in a memory. The term "side information" encompasses data comprising spatial and/or temporal measurements different from those included in the event data but related to the SAE in space-time. Side information may include data representing both past events and current events depending on the application.

Next, in step 230, the association module 120 associates the event data with the side information by soft association to form association data. In contrast to hard assignment where all measurements are strictly associated with other assignments, soft association means allowing measurements to be partially associated with each other. In applying soft association techniques, time- and distance-related factors may be weighted differently so as to give some factors more prominence than others. Weighting may be accomplished by, for example, passing a factor through a transform function such as squaring or exponentiation. Again, depending on the particular application, the side information may include data describing past events or data describing current events, including those achieved by active sensing. As just a few examples, a soft association may be based on factors such as nearest neighbor, driving distance, walking distance, linear distance, co-occurrence, and physical diffusion in the atmosphere, wind, or soil.

In step 240, one or more estimation techniques are applied to the association data by the estimation module 130 to form estimation data by determining one or more dependences between factors in the event data and side information. More precisely, the estimation module 130 infers on various event-related quantities utilizing estimation techniques. These estimation techniques may include, but are not limited to, spatial autoregression (SAR), geographically weighted regression (GWR), dynamic network analysis, competing risk management, maximum likelihood estimation, Bayesian parameter estimation, Bayesian belief network construction, hidden Markov model estimation, and the like. SAR, for example, comprises a technique for estimating continuous values at different spatial locations, which models these values as being dependent on neighboring spatial locations. GWR, in contrast, is a technique for estimating continuous values at different spatial locations, which models the target values as being dependent on nearby covariate measurements, weighted according to a Gaussian distribution. Lastly, network analysis encompasses various techniques in mathematical graph theory for extracting information from networks.

After the estimation module 130 forms the estimation data by inferring on various event-related quantities utilizing estimation techniques in step 240, the feedback module 140, in step 250, utilizes the estimation data to determine whether updated or additional side information would be beneficial in achieving more precise inferences. The determination may be based on, for example, methods of cross validation. If the feedback module 140 determines that more side information would indeed be beneficial, the feedback module 140 may cause the side information to be updated, or additional side information to be collected (i.e., "adaptive analysis"). The system 100 then moves to step 260 so that any newly added side information may be softly associated with the event information by the association module 120 to form refined association data. Once so associated, the estimation module 130 again applies one or more estimation techniques to the now-bolstered association data in step 270 to form new estimation data.

Lastly, in step 280, the characterization module 150 determines at least one of a rate, a factor, a likelihood, a value, a time, a location, and a cause for the SAE by applying one or more characterization techniques to the estimation data. The characterization module 150 may apply, for example, rate prediction techniques, cause-effect analysis, system diagnosis, or missing data imputation.

Notably, while several techniques for accomplishing the association, estimation, and characterization are described above, these techniques are merely illustrative. For this reason, numerous additional techniques may be used and the results will still come within the scope of the invention. Both those techniques explicitly described above and the many additional techniques falling within the scope of the invention will be familiar to one having skill in the relevant arts. Moreover, many such association, estimation, and characterization techniques are described in various readily-available publications. These publications include the following books: N. A. C. Cressie et al., *Statistics for Spatio-Temporal Data*. John Wiley and Sons, 2011; A. S. Fotheringham et al., *Geographically Weighted Regression*, John Wiley and Sons, 2002; P-N Tan et al., *Introduction to Data Mining*, Pearson Addison Wesley, 2006; and R. O. Duda, *Pattern Classification* 2$^{nd}$ *Edition*. John Wiley and Sons, 2004. These publications also include the following journal articles: U. Y. Nahm, *Mining Soft-Matching Association Rules*, Proceedings of the CIKM-2002, pp. 681-683, November 2002; I. J. Myung, *Tutorial on Maximum Likelihood Estimation*, Journal of Mathematical Psychology, Vol. 47, pp. 90-100, Academic Press, 2003; J. Cheng, *An Algorithm for Bayesian Belief Network Construction from Data*, In Proceedings of AI & Statistics 1997, 1997; R. L. Prentice et al., *The Analysis of Failure Times in the Presence of Competing Risks*, Biometrics, Vol. 34, No. 4, pp. 541-554, International Biometric Society, December 1978; and A. Gichangi et al., *The Analysis of Competing Risks Data: A Guided Tour*, University of Southern Denmark, Odense, Denmark, 2005. Each of these books and journal articles is hereby incorporated by reference herein.

In this manner, the storage module 110 in steps 210 and 220 stores both event data and side information. The event data is representative of an event and comprises spatiotemporally ambiguous measurements. In contrast, the side information comprises at least one of spatial data and temporal data related to the event in space-time. The estimation module 130 in step 230 then takes this event data and side information and associates the two by soft association to form association data. Such association may be performed based on, for example, nearest neighbor, driving distance, walking distance, linear distance, co-occurrence, or physical diffusion. Subsequently, the estimation module 130 applies one or more estimation techniques to the association data in step 240 to form estimation data. Applying the estimation techniques may comprise applying, for example, spatial autoregression, geographically weighted regression, dynamic network analysis, competing risk management, maximum likelihood estimation, Bayesian parameter estimation, Bayesian belief network construction, or hidden Markov model estimation. If necessary, the feedback module 140 in step 250 then collects additional side information in response to the estimation data so that association and estimation may be repeated if necessary in steps 260 and 270. Finally, the characterization module 150 determines at least one of a rate, a factor, a likelihood, a value, a time, a location, and a cause for the event by applying one or more characterization techniques to the estimation data in step 280. This characterization may be accomplished by applying, for example, rate prediction, cause/effect analysis, system diagnosis, or missing data imputation. The characterization may include determining at least one of a rate, a factor, and a cause related to the event.

Advantageously, the above described system 100 and the associated method 200 leverage the fact that spatiotemporal ambiguity tends to behave in a particular way that can be explicitly handled by models to better improve generalization and accuracy. Applying the system 100 in FIG. 1 by the method 200 in FIG. 2 outputs predictions for event likelihoods or summary statistics of past data which are substantially more accurate than predictions that ignore spatiotemporal ambiguity. In other words, systems and methods in accordance with aspects of the invention allow SAEs to be more precisely modeled, estimated, and predicted.

Functional aspects of the above-described system 100 and the method 200, as well as their several advantages, can be further understood by reference to the following exemplary analysis descriptions.

Exemplary Analysis of SAEs Related to Public Utilities

The above-described system 100 and method 200 may, for example, be applied to characterizing failures in public utilities such as pipe breaks and power line failures for the purpose of predicting and mitigating these issues. In steps 210 and 220, for example, the storage motile 110 stores historical records of spatiotemporally ambiguous "past events" that include water pipe breaks or power line failures (i.e., the event data), and also stores "historical side information" that includes water/power network structure and asset properties (e.g., material, age, etc), weather, traffic, and other such data related to the event data in space-time (i.e., the side information).

Next, in step 230, the association module 120 performs an initial spatial-temporal association and assigns each of the past events or side information values to a set of pre-defined points (e.g. grids on latitude-longitude plane, intersections, or known pipe/power line segments).

In step 240, the estimation module 130 then uses one or more approaches to perform spatial-temporal event estimation with uncertainty. The choice of model is based on domain knowledge and performance. For example: SAR models spatial ambiguity in the output (e.g., breakage events); GWR does so in the input (i.e., side information); network analysis further incorporates real-world connectivity in the water/power network; and competing risk analysis weighs the likelihood of the true event among a number of possible alternatives (e.g., water pipe or power line segments). If necessary, such analysis may optionally be used to guide the active sensing or accumulation of new side information in step 250, such as necessary pressure/voltage data. Any new side information achieved by this active/adaptive sensing is then associated with the event data by the association module 120 in step 260, and the estimation module 130 again performs spatial-temporal event estimation in step 270.

Statistical analysis can then be applied by the characterization module 150 to the data created by steps 210-270 in order to characterize the SAE in step 280. As one example, rate prediction techniques may be applied to determine where future water leak and power line breakages are likely to occur under various weather conditions. In another example, cause/effect analysis may be used to quantify the effect of different environmental factors, such as a water temperature drop, on the likelihood of having a pipe break. Lastly, as even one more example, system diagnosis techniques may be applied to determine steps for mitigating the chances of pipe breaks, by, for example, reducing pipe pressure.

Exemplary Analysis of SAEs Related to Health

The above-described system 100 and method 200 may also, as another example, be applied to predicting health issues such as flu outbreaks and mitigating those issues. In step 210 and 220 the storage module 110 stores historical records of spatiotemporally ambiguous "past events" that include flu instances (i.e., the event data), and also stores "historical side information" that includes patient addresses, demographics, social interactions, weather, atmospheric conditions, and other such data related to the event data in space-time (i.e., the side information).

Next, in step 230, the association module 120 performs an initial spatial-temporal association and assigns each of the past events or side information values to a set of pre-defined points (e.g. grids on latitude-longitude plane, addresses, zip codes, and census tracts).

In step 240, the estimation module 130 then uses one or more approaches to perform spatial-temporal event estimation with uncertainty. Again, the choice of model is based on domain knowledge and performance. For example: SAR models spatial ambiguity in the output (e.g., flu outbreak events); GWR does so in the input (ie., side information); and competing risk analysis weighs the likelihood of the true event among a number of possible alternatives (e.g., disease propagation by food, or by air). If necessary, such analysis may optionally be used to guide the active sensing or accumulation of new side information in step 250 (e.g., a survey of certain patients whose social interaction data is missing). Any new side information achieved by this active/adaptive sensing is then associated with the event data by the association module 120 in step 260, and the estimation module 130 again performs spatial-temporal event estimation in step 270.

Statistical analysis can then be applied by the characterization module 150 to the data created by steps 210-270 to characterize the SAE in step 280. As one example, rate prediction techniques may be applied to determine where future flu outbreaks under various weather conditions are likely to occur. In another example, cause/effect analysis may be used to quantify the effect of different environmental factors on flu outbreaks, such as high pollen content versus cold weather. As even one more example, system diagnosis techniques may be applied to determine causes of the flu outbreak, such as contaminated food in supermarkets. Finally, data imputation techniques may provide additional causal information such as whether a group of patients may have shopped in a contaminated supermarket.

Exemplary System and Article of Manufacture Details

As will be appreciated by one skilled in the art and as described above, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
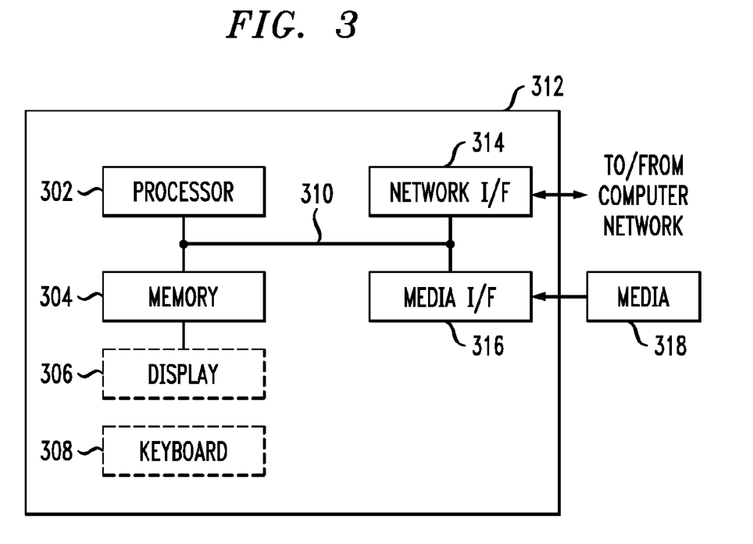
FIG. 3 depicts a computer system that may be useful in implementing one or more aspects and/or elements of the invention.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a storage module, an association module, an estimation module, a feedback module, and a characterization module. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:

storing event data representative of an event, the event data comprising spatiotemporally ambiguous measurements;

storing side information, the side information comprising at least one of spatial data and temporal data related to the event in space-time;

associating the event data with the side information by soft association to form association data; applying one or more estimation techniques to the association data to form estimation data;

determining at least one of a rate, a factor, a likelihood, a value, a time, a location, and a cause for the event by applying one or more characterization techniques to the estimation data; and providing a system, wherein the system comprises distinct software modules, each of the distinct software modules being embodied on a non-transitory computer-readable storage medium, and wherein the distinct software modules comprise a storage module, an association module, an estimation module, and a characterization module, wherein:

the step of storing event data and the step of storing side information are carried out by the storage module executing on at least one hardware processor;

the step of associating the event data with the side information is carried out by the association module executing on the at least one hardware processor;

the step of applying one or more estimation techniques to the association data is carried out by the estimation module executing on the at least one hardware processor; and the step of determining at least one of a rate, a factor, a likelihood, a value, a time, a location, and a cause for the event is carried out by the characterization module executing on the at least one hardware processor.

2. The method of claim 1, wherein the step of storing event data comprises storing data in at least one of a random access memory, a read only memory, a fixed memory device, a removable memory device, and a flash memory.

3. The method of claim 1, wherein the step of storing side information comprises storing data in at least one of a random access memory, a read only memory, a fixed memory device, a removable memory device, and a flash memory.

4. The method of claim 1, further comprising the step of determining side information to be collected based at least in part on the estimation data.

5. The method of claim 4, wherein the step of determining side information to be collected is based at least in part on cross validation.

6. The method of claim 1, further comprising the step of collecting side information based at least in part on the estimation data.

7. The method of claim 1, wherein the side information is obtained at least in part by active sensing.

8. The method of claim 1, wherein the step of associating the event data with the side information comprises performing an association based on at least one of nearest neighbor, driving distance, walking distance, linear distance, co-occurrence, and physical diffusion.

9. The method of claim 1, wherein the step of applying one or more estimation techniques to the association data comprises applying at least one of spatial data autoregression, geographically weighted regression, dynamic network analysis, competing risk management, maximum likelihood estimation, Bayesian parameter estimation, Bayesian belief network construction, and hidden Markov model estimation.

10. The method of claim 1, wherein the step of determining at least one of a rate, a factor, a likelihood, a value, a time, a location, and a cause for the event comprises applying at least one of rate prediction, cause/effect analysis, system diagnosis, and missing data imputation.

11. A computer program product comprising a non-transitory computer readable storage medium having computer readable program code embodied therewith, the computer readable program code comprising computer readable program code that when executed by a hardware processor is configured to:
  store event data representative of an event, the event data comprising spatiotemporally ambiguous measurements;
  store side information, the side information comprising at least one of spatial data and temporal data related to the event in space-time;
  associate the event data with the side information by soft association to form association data;
  apply one or more estimation techniques to the association data to form estimation data; and
  determine at least one of a rate, a factor, a likelihood, a value, a time, a location, and a cause for the event by applying one or more characterization techniques to the estimation data.

12. An apparatus comprising:
a memory; and
at least one processor, coupled to the memory, and operative to perform the steps of:
storing event data representative of an event, the event data comprising spatiotemporally ambiguous measurements;
storing side information, the side information comprising at least one of spatial data and temporal data related to the event in space-time;
associating the event data with the side information by soft association to form association data;
applying one or more estimation techniques to the association data to form estimation data; and
determining at least one of a rate, a factor, a likelihood, a value, a time, a location, and a cause for the event by applying one or more characterization techniques to the estimation data.

13. The apparatus of claim 12, further comprising a plurality of distinct software modules, each of the distinct software modules being embodied on a non-transitory computer-readable storage medium, and wherein the distinct software modules comprise a storage module, an association module, an estimation module, and a characterization module, wherein:
  the at least one processor is operative to perform the step of storing event data and the step of storing side information by executing the storage module;
  the at least one processor is operative to perform the step of associating the event data with the side information by executing the association module;
  the at least one processor is operative to perform the step of applying one or more estimation techniques to the association data by executing the estimation module; and
  the at least one processor is operative to perform the step of determining at least one of a rate, a factor, a likelihood, a value, a time, a location, and a cause for the event by executing the characterization module.

14. An apparatus comprising:
means for storing event data representative of an event, the event data comprising spatiotemporally ambiguous measurements;
means for storing side information, the side information comprising at least one of spatial data and temporal data related to the event in space-time;
means for associating the event data with the side information by soft association to form association data;
means for applying one or more estimation techniques to the association data to form estimation data; and
means for determining at least one of a rate, a factor, a likelihood, a value, a time, a location, and a cause for the event by applying one or more characterization techniques to the estimation data.

* * * * *